United States Patent [19]

Smith et al.

[11] 3,726,930
[45] Apr. 10, 1973

[54] PREPARATION OF 3,5-DINITROBENZOTRIFLUORIDE COMPOUNDS

[75] Inventors: Robert A. Smith, Anaheim; Kirby A. Salisbury, Santa Ana; Morris A. Leaffer, Palo Alto, all of Calif.

[73] Assignee: United States Borax & Chemical Corporation, Los Angeles, Calif.

[22] Filed: Oct. 29, 1970

[21] Appl. No.: 85,224

[52] U.S. Cl. ..................................260/646, 252/182
[51] Int. Cl. ..............................................C07c 79/12
[58] Field of Search........................................260/646

[56] References Cited

UNITED STATES PATENTS 2,257,093   9/1941   Friedrich et al. ......................260/646
3,100,170   8/1963   Levy.........................................156/20

Primary Examiner—Leland A. Sebastian
Attorney—James R. Thornton

[57] ABSTRACT

3,5-Dinitrobenzotrifluoride compounds are prepared by nitration of the corresponding benzotrifluorides with a mixture of oleum and alkali metal nitrate in which the mixture has an $SO_3:MNO_3$ molar ratio of 1.5 to 2.0. Alternatively a portion of the alkali metal nitrate can be replaced by nitric acid, but the molar ratio of $SO_3$ to total nitrate remains the same. The reaction takes place at a temperature of up to about 225°C. in relatively short periods of time.

13 Claims, No Drawings

PREPARATION OF 3,5-DINITROBENZOTRIFLUORIDE COMPOUNDS

This invention relates to the production of 3,5-dinitrobenzotrifluoride compounds which are useful as intermediates for the preparation of herbicidal benzotrifluoride derivatives.

Benzotrifluoride compounds, such as the chlorinated benzotrifluorides, have been nitrated by use of mixtures of nitric and sulfuric acids at relatively low temperatures such as below about 90°C. Because of the difficulty in adding the second nitro group to the ring at such low temperatures, long reaction times are generally required such as on the order of several days. Attempts to increase the reaction temperatures and thereby reduce reaction time result in considerable oxidation of the trifluoromethyl group and production of carboxylic acid impurity.

We have found an improved method for nitrating the benzotrofluorides in which substantially higher reaction temperatures can be employed without increasing the amount of carboxylic acid impurity nor evolving copious amounts of unwanted $SO_3$ or nitrogen oxide fumes. By employing the procedure of the present invention, relatively short reaction times are used to give good yields of the desired dinitro-substituted products.

Thus, according to the present invention, there is provided the method for producing 3,5-dinitrobenzotrifluorides which comprises reacting a benzotrifluoride compound with a mixture of sulfuric acid having excess $SO_3$ and an alkali metal nitrate in which the $SO_3:MNO_3$ molar ratio in the mixture is in the range from about 1.5 to 2.0. Thus, by employing such a nitrating mixture one can use elevated reaction temperatures of up to about 225°C. without fuming or substantial oxidation of the benzotrifluoride group.

The sulfuric acid should contain excess $SO_3$ and preferably corresponds to about 95–40 weight percent $H_2SO_4$ plus about 5–60 weight percent $SO_3$. We prefer that the sulfuric acid be about 20–40 percent oleum. The alkali metal nitrate is preferably either sodium nitrate or potassium nitrate. It is preferred that the nitrate ion in the nitrating mixture be present in an excess of that required for stoichiometry. Thus, as large as a 10 fold excess of the nitrating agent can be used.

By employing the critical $SO_3:MNO_3$ molar ratio of 1.5 to 2.0, undesirable fuming during the reaction is avoided even at up to temperatures of about 225°C. When the ratio is below 1.5, oxides of nitrogen evolve and when it is above 2.0, $SO_3$ is evolved. In a preferred nitrating mixture, a portion of the alkali metal nitrate is replaced by nitric acid, and in this case the $SO_3:(MNO_3 + HNO_3)$ molar ratio should also be in the range of 1.5 to 2.0. The ratio of nitric acid to alkali metal nitrate in such mixtures is preferably up to about 5.

The benzotrifluoride compounds used as a starting material can be any benzotrifluoride, unsubstituted or substituted, which will form a 3,5-dinitro derivative. Such compounds include benzotrifluoride, 2,4-dichlorobenzotrifluroide, p-chlorobenzotrifluoride, 2-chlorobenzotrifluoride, 2-bromobenzotrifluoride, 4-bromobenzotrifluoride, and the like.

The reaction takes place at elevated temperatures of up to about 225° preferably in the range from about 50°–210b$LC$. As pointed out above, relatively short reaction times such as less than about one hour are required at elevated temperatures such as between 100°–160°C.

The desired 3,5-dinitrobenzotrifluoride product is isolated and purified by conventional procedures. For example, the reaction mixture can be added to a large volume of cold water from which the crystalline product will precipitate. The crude product is isolated such as by filtration and can be purified if necessary by recrystallization.

The following examples are given to illustrate the process of the present invention.

EXAMPLE I

To a one liter flask was added 398 g. of $H_2SO_4$-25 percent $SO_3$ oleum (1.49 moles $SO_3$; prepared by combining 275 g. of 30 percent oleum and 133 g. of 15 percent oleum). The contents of the flask were cooled by an ice bath and stirred while 80 g.(0.8 mole) of potassium nitrate was added in several small portions, while maintaining the pot temperature below 80°C. To this mixture was then added 20.0 g. (0.093 mole) of 2,4-dichlorobenzotrifluoride dropwise over a 10-minute period while maintaining the pot temperature at 70°C. The resultant mixture was heated to 160°C. over a 10-minute period and maintained at this temperature for 0.5 hour. It was then allowed to cool to 100°–120°C. and the reaction mixture poured into a 2-liter beaker which was ⅔ full with cracked ice. The desired product solidified to a pale yellow solid in the cold aqueous solution and was isolated by filtration. After drying, 24.6 g. (86.7 percent yield) of 2,4-dichloro-3,5-dinitrobenzotrifluoride was obtained as a yellow crystalline solid, m.p. 72°–73.5°C.

EXAMPLE II

The procedure of Example I was repeated except a mixture of 330 g. of $H_2SO_4$ – 30 percent $SO_3$ oleum (representing 1.24 moles of $SO_3$), 32.3 g. (0.38 mole) of sodium nitrate and 19.6 g. of 90 percent nitric acid (0.28 mole $HNO_3$) was employed as the nitrating agent for 35.5 g. (0.165 mole) of 2,4-dichlorobenzotrifluoride. The mixture was maintained at 100°C. for 16 hours and then 140°C. for an additional hour and the product isolated as described in Example I. A yield of 42.5 g. (84 percent) was obtained.

EXAMPLE III

To 20 g. of fuming sulfuric acid (30 percent) which was chilled in an ice bath was added 4 g. of potassium nitrate. To this mixture was added 1 g. of 2,4-dichlorobenzotrifluoride and the stirred solution maintained at 120°C. for 15 hours. The reaction mixture was then poured onto ice and extracted with two 25 ml. portions of chloroform. The organic extracts were washed with saturated sodium bicarbonate and then water. The chloroform was then removed by distillation to give 1.22 g. (86 percent yield) of 2,4-dichloro-3,5-dinitrobenzotrifluoride.

EXAMPLE IV 2,4-Dichlorobenzotrifluoride (32.2 g.; 0.15 mole) was nitrated according to the procedure of Example I using a mixture of 301 g. of $H_2SO_4$ – 30 percent oleum (1.12 moles $SO_3$) and 51 g. (0.6 mole) of sodium nitrate. The reaction mixture was heated at 120°C. for 12 hours and the product then isolated according to Example I to give 37.6 g. (82 percent yield) of the desired 2,4-dichloro-3,5-dinitrobenzotrifluoride.

EXAMPLE V 2,4-Dichlorobenzotrifluoride (20.2 g.; 0.94 mole) was nitrated according to the procedure of Example I using a mixture of 327 g. of $H_2SO_4$ – 30 percent oleum (1.22 moles $SO_3$) and 80.5 g. (0.805 mole) of potassium nitrate. The reaction took place at 160°C. for 45 minutes to give an 80 percent yield of the desired product.

EXAMPLE VI p-Chlorobenzotrifluoride (27.0 g.; 0.15 mole) was nitrated according to the procedure of Example II using a mixture of 272 g. of $H_2SO_4$ – 30 percent $SO_3$ oleum (1.02 moles $SO_3$), 25.5 g. (0.30 mole) of sodium nitrate and 21 g. of 90% $HNO_3$ (0.3 mole $HNO_3$). The reaction mixture was heated at 100°C. for 20 hours to give an 85 percent yield of 4-chloro-3,5-dinitro-benzotrifluoride.

EXAMPLE VII

Benzotrifluoride (14.6 g.; 0.10 mole) was nitrated according to the procedure of Example II using a mixture of 256g. of $H_2SO$–30 percent $SO_3$ oleum (0.96 mole $SO_3$), 44.0 g. (0.436 mole) of potassium nitrate and 11.5 g. of 90 percent nitric acid (0.164 mole $HNO_3$). The mixture was stirred at 120°C. for one hour and then poured into about 1500 ml. of ice water. The resultant slurry was extracted with three 200 ml. portions of chloroform. The combined chloroform extracts were washed with water, 5 percent sodium bicarbonate and again with water. After drying over sodium sulfate, the chloroform was evaporated to leave 13 g. ( 55 percent) of 3,5-dinitrobenzotrifluoride.

The 3,5-dinitrobenzotrifluorides are useful as intermediates for the production of herbicidal benzotrifluoride derivatives. For example, one or more halogen substituents on the aromatic ring can be replaced by substituted amines to give outstanding selective herbicides. The following example illustrates the use of 2,4-dichloro-3,5-dinitrobenzotrifluoride as an intermediate for herbicides.

EXAMPLE VIII $N^1$, $N^1$-dimethylene-$N^3$, $N^3$-di-n-propyl-2,4-dinitro-6-trifluoromethyl-1,3-phenylenediamine A heavy walled glass reaction tube of approximately 50 ml. capacity was charged with 7.0 grams (0.023 mole) of 2,4-dichloro-3,5-dinitrobenzotrifluoride, 4.64 grams (0.0458 mole) of di-n-propylamine and 40 ml. of absolute ethanol. The tube was sealed and heated in an oil bath at 94°–99°C. for 98 hours. The cooled reaction mixture was then evaporated to dryness to give an oily residue which was extracted with boiling diethyl ether. The insoluble di-n-propylamine hydrochloride was removed by filtration and washed with additional ether. The combined ether filtrates were evaporated to give an oily orange residue which was dissolved in 100 ml. of absolute ethanol and decolorized with activated charcoal. The ethanol and volatiles were removed by evaporation under reduced pressure to give N,N-di-n-propyl-3-chloro-2,6-dinitro-4-trifluoromethylaniline (6.77 grams) as a viscous reddish oil. A solution of 4 grams (0.0108 mole) of N,N-di-n-propyl-3-chloro-2,6-dinitro-4-trifluoromethylaniline and 0.93 grams (0.0216 mole) of ethyleneimine in 50 ml. of absolute ethanol was stirred overnight at 35°C. The solvent was removed by evaporation under reduced pressure to give a residue which was extracted with boiling hexane. The hexane extract was evaporated to dryness and the residue dissolved in absolute ethanol. After decolorizing with charcoal, the ethanol and volatiles were removed by evaporation under reduced pressure to give the product as a viscous amber oil, which was identified by its proton nuclear magnetic resonance spectrum.

Various changes and modifications of the invention can be made and, to the extent that such variations incorporate the spirit of this invention, they are intended to be included within the scope of the appended claims.

What is claimed is:

1. The method for producing a 3,5-dinitrobenzotrifluoride which comprises reacting a benzotrifluoride compound with a mixture of sulfuric acid having excess $SO_3$ and an alkali metal nitrate at a temperature of up to about 225°C., said mixture having an $SO_3$:$MNO_3$ molar ratio in the range of about 1.5 to 2.0, in which M represents said alkali metal.

2. The method in accordance with claim 1 in which said mixture also contains nitric acid as a source of nitrate ions and the $SO_3$:($MNO_3$ + $HNO_3$) molar ratio is in the range of about 1.5 to 2.0.

3. The method in accordance with claim 1 in which said sulfuric acid is 20–40 percent oleum.

4. The method in accordance with claim 1 in which said benzotrifluoride compound is 2,4-dichlorobenzotrifluoride.

5. The method in accordance with claim 1 in which said benzotrifluoride compound is p-chlorobenzotrifluoride.

6. The method in accordance with claim 1 in which said benzotrifluoride compound is benzotrifluoride.

7. The method in accordance with claim 1 in which said reaction temperature is in the range of about 50° to 210°C.

8. The method in accordance with claim 1 in which an excess of the stoichiometric amount of nitrate compound is employed.

9. The method for producing a 3,5-dinitrobenzotrifluoride compound which comprises reacting at a temperature of about 50° to 210°C. a benzotrifluoride compound with a mixture of 20–40 percent oleum, alkali metal nitrate and nitric acid in which the $SO_3$:($MNO_3$ + $HNO_3$) molar ratio is about 1.5 to 2.0 and the $HNO_3$:$MNO_3$ molar ratio is up to about 5, the mixture of nitrate compounds being present in a stoichiometric excess, said M representing said alkali metal.

10. The method in accordance wite with 9 in which said benzotrifluoride compound is p-chlorobenzotrifluoride.

11. The method in accordance with claim 9 in which said benzotrifluoride compound is 2,4-dichlorobenzotrifluoride.

12. The method in accordance with claim 9 in which said alkali metal is sodium or potassium.

13. In the method for nitration of a benzotrifluoride compound at an elevated temperature of up to about 225°C, the improvement which consists of employing a stable nitration composition comprising a mixture of sulfuric acid having excess $SO_3$ and an alkali metal nitrate in which the $SO_3:MNO_3$ molar ratio in said mixture is in the range of from about 1.5 to 2.0, wherein M is an alkali metal.

\* \* \* \* \*